United States Patent [19]
Mahoney

[11] Patent Number: 5,950,786
[45] Date of Patent: Sep. 14, 1999

[54] DISC CLUTCH ASSEMBLY

[75] Inventor: Paul E. Mahoney, Harrisville, R.I.

[73] Assignee: Delta Clutch, Inc., Providence, R.I.

[21] Appl. No.: 08/868,869

[22] Filed: Jun. 4, 1997

[51] Int. Cl.$^6$ ..................................................... F16D 13/56
[52] U.S. Cl. .................................. 192/70.19; 192/70.27; 192/89.23
[58] Field of Search .............................. 192/70.19, 70.27, 192/89.23, 70.11, 70.16

[56] References Cited

U.S. PATENT DOCUMENTS

| | | | |
|---|---|---|---|
| 1,513,203 | 10/1924 | Wemp ................................... | 192/70.14 |
| 1,886,865 | 11/1932 | Bixby . | |
| 2,256,714 | 9/1941 | Hunt ..................................... | 192/70.27 |
| 3,291,272 | 12/1966 | Fawick . | |
| 3,300,007 | 1/1967 | Motsch ................................. | 192/70.17 |
| 3,317,013 | 5/1967 | Smirl . | |
| 3,981,381 | 9/1976 | Nosek ................................... | 192/70.18 |
| 4,462,497 | 7/1984 | Cucinotta et al. ................... | 192/70.28 |
| 4,977,991 | 12/1990 | Mahoney . | |
| 5,010,992 | 4/1991 | Maurer ................................. | 192/70.27 |
| 5,127,505 | 7/1992 | Beccaris .............................. | 192/70.19 |

*Primary Examiner*—Charles A. Marmor
*Assistant Examiner*—Saúl J. Rodríguez
*Attorney, Agent, or Firm*—St. Onge Steward Johnston & Reens LLC

[57] ABSTRACT

A disc clutch assembly for transmitting torque from a torque source to a torque destination is provided, which includes a first plate with apertures and a second plate located between the torque source and the first plate, where the second plate is in driving engagement with the torque source. Fastening members are used to secure the first plate to the second plate. Located between the first and second plates are a driving plate with apertures and a driven plate which has a frictional surface and an interface for engaging with the torque destination. A resilient member is secured to the first plate to provide force toward the torque source and to release the force. Substantially dowel-shaped members are positioned adjacent the driving plate and are slidable through the apertures of the first plate to be adjacent the resilient member. These dowel-shaped members are responsive to the application and release of the force of the resilient member to release the driven plate from the torque transmitting contact and to urge the driving plate and the driven plate toward each other so that the driven plate is in torque transmitting contact with the driving plate, respectively. Straps attached to the first plate and the driving plate through the apertures of the driving plate are responsive in conjunction with the dowel-shaped members to the application and release of the force of the resilient member to better effectuate clutch engagement and disengagement and to reduce wear of the dowel-shaped members.

16 Claims, 4 Drawing Sheets

DISC CLUTCH ASSEMBLY

FIELD OF THE INVENTION

The present invention relates to a disc clutch assembly, and more specifically, to a multiple disc clutch assembly which reduces rattling or knocking of discs and which provides more effective engagement and disengagement of the clutch.

BACKGROUND OF THE INVENTION

Multiple disc clutch assemblies for coupling to and decoupling from a source of torque are well-known in the art. For example, see U.S. Pat. Nos. 1,886,865, 3,291,272 and 3,317,013.

However, such prior art clutches have disadvantages. For one, the prior art clutches are typically mechanically complex with complicated linkage mechanisms for achieving clutch engagement and disengagement. Also, the prior art clutches usually require confined housing or other surrounding support structure that restricts airflow around the various components of the clutch, thereby limiting clutch life and decreasing efficiency by providing insufficient cooling and permitting heat buildup.

U.S. Pat. No. 4,977,991 ("the '991 patent"), which is assigned to the assignee of the present invention, provides a multiple disc clutch assembly 10 which achieves clutch engagement and disengagement in a more efficient and effective manner than the prior art clutches discussed above. The '991 patent accomplishes this by including activating dowels 50 slidably mounted in apertures 52 in a resilient plate 36 of the clutch assembly 10 to engage and disengage the clutch 10 (col. 4, lines 1–22).

Although the clutch assembly 10 of the '991 patent provides a significant improvement over other clutch assemblies, the clutch assembly 10 of the '991 patent has disadvantages worth noting. First, the activating dowels 50 tend to wear out faster than is desired. Thus, the clutch assembly 10 is costlier to maintain than is desired. And second, there is undesirable rattling or knocking of discs and the activating dowels 50 in the clutch assembly design of the '991 patent.

What is desired, therefore, is a disc clutch assembly which achieves clutch engagement and disengagement in an effective and efficient manner without use of complicated linkage mechanisms, which provides sufficient airflow to prevent damaging heat buildup, which reduces undesirable rattling or knocking of discs, and which decreases the wear of clutch assembly components.

SUMMARY OF THE INVENTION

Accordingly, it is an object of the invention to provide a disc clutch assembly which achieves clutch engagement and disengagement in an effective and efficient manner without use of complicated linkage mechanisms.

A further object of the invention is to provide a disc clutch assembly which provides sufficient airflow to prevent damaging heat buildup.

Still another object of the invention is to provide a disc clutch assembly which decreases wear of clutch assembly components.

These and other objects are realized by a disc clutch assembly for transmitting torque from a torque source to a torque destination, which includes a first plate with apertures and a second plate located between the torque source and the first plate, where the second plate is in driving engagement with the torque source. Fastening members are used to secure the first plate to the second plate. Located between the first and second plates are a driving plate with apertures and a driven plate which has a frictional surface and an interface for engaging with the torque destination. A resilient member is secured to the first plate to provide force toward the torque source and to release the force. Substantially dowel-shaped members positioned adjacent the driving plate is slidable through the apertures of the first plate to be adjacent the resilient member. These dowel-shaped members are responsive to the release of the force of the resilient member to urge the driving plate and the driven plate toward each other so that the driven plate is in torque transmitting contact with the driving plate, and the dowel-shaped members are responsive to the application of the force to release the driven plate from the torque transmitting contact. Straps attached to the first plate and the driving plate through the apertures of the driving plate are responsive in conjunction with the dowel-shaped members to the application and release of the force of the resilient member to better effectuate clutch engagement and disengagement and to reduce wear of the dowel-shaped members.

The invention and its particular features and advantages will become more apparent from the following detailed description considered with reference to the accompanying drawings.

DETAILED DESCRIPTION OF THE INVENTION

Figure 1:
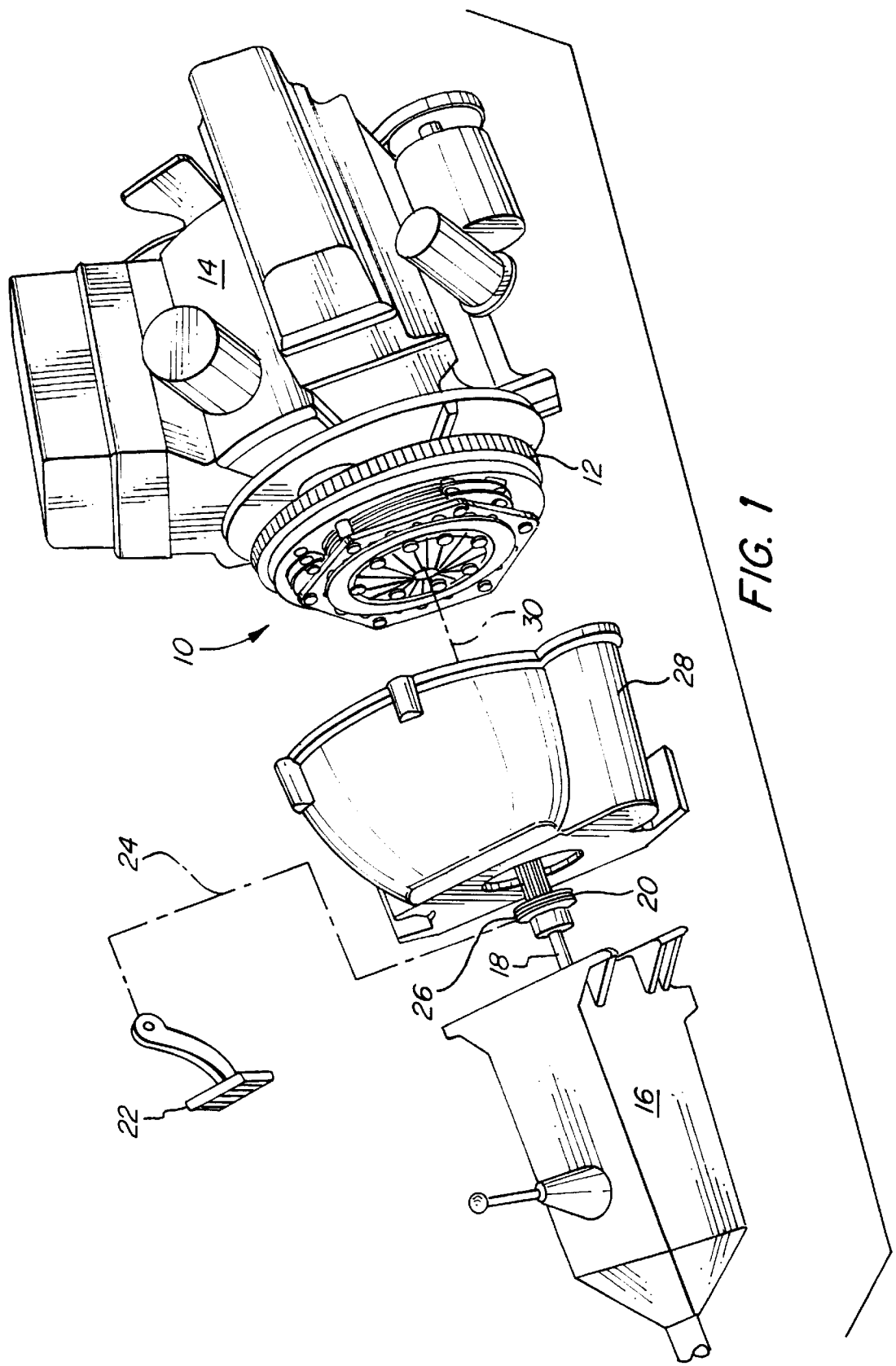
FIG. 1 is an isometric drawing of a disc clutch assembly of the present invention shown mounted in a drive train.

Referring to FIG. 1, there is shown an embodiment of a disc clutch assembly 10 of the present invention mounted along an axis 30 in a conventional manner on a flywheel 12 of a torque source, such as an internal combustion engine 14 of a motor vehicle, for use in transmitting torque from the engine 14 to a torque destination, such as a transmission block 16, via a shaft 18. The coupling of the engine torque to and the decoupling of the engine torque from the transmission 16 is controlled by a clutch pedal 22 accessible to an operator of the motor vehicle. A throwout bearing 20 located adjacent a splined section 26 of the shaft 18 is connected to the clutch pedal 22 in a conventional manner, represented by a broken line 24, and is actuated by the clutch pedal 22 to engage or disengage a resilient member of the disc clutch assembly 10 for coupling or decoupling of the engine torque from the transmission 16. The clutch assembly 10 is enclosed in a housing 28.

Figure 2:
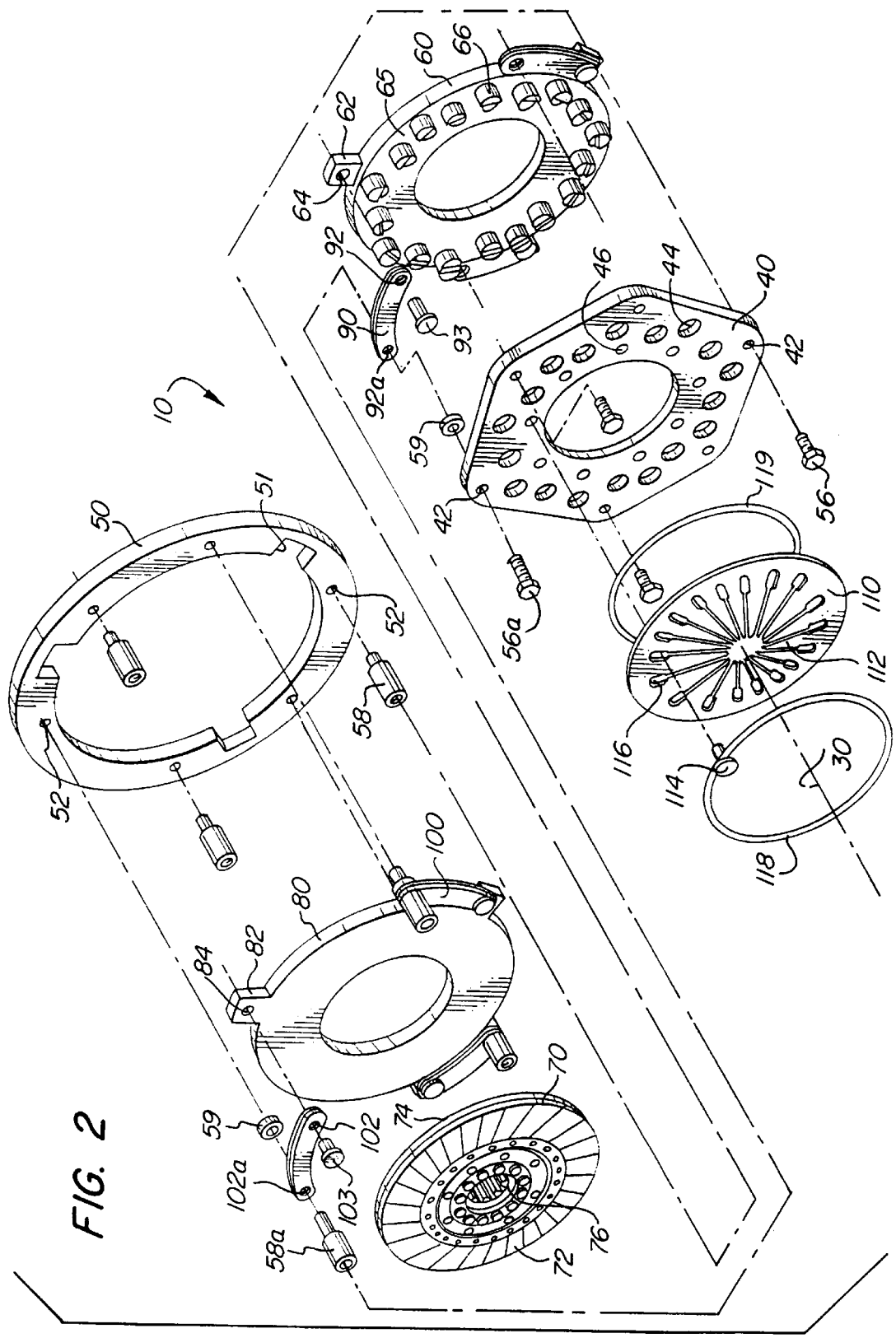
FIG. 2 is an exploded view of the disc clutch assembly of FIG. 1.

FIG. 2 shows in detail the construction of the disc clutch assembly 10 of the present invention. The disc clutch assembly 10 includes a first plate 40 having a first set of apertures 42, a second set of apertures 44 and a third set of apertures 46, and a second plate 50 having apertures 52. The second plate 50 is in driving engagement with the flywheel 12, as shown in FIG. 1. The first and second plates 40, 50 are secured to one another by fastening members, which are illustrated as a screw 56 and an assembly dowel 58, extending from the first set of apertures 42 of the first plate 40 to the apertures 52 of the second plate 50. Other conventional fastening members may be used in place of the screw 56 and the assembly dowel 58. As would be apparent to one skilled in the art, the first and second plates 40, 50 may be secured to one another by fastening members without employing the first set of apertures 42 of the first plate 40 and the apertures 52 of the second plate 50.

Figure 3:
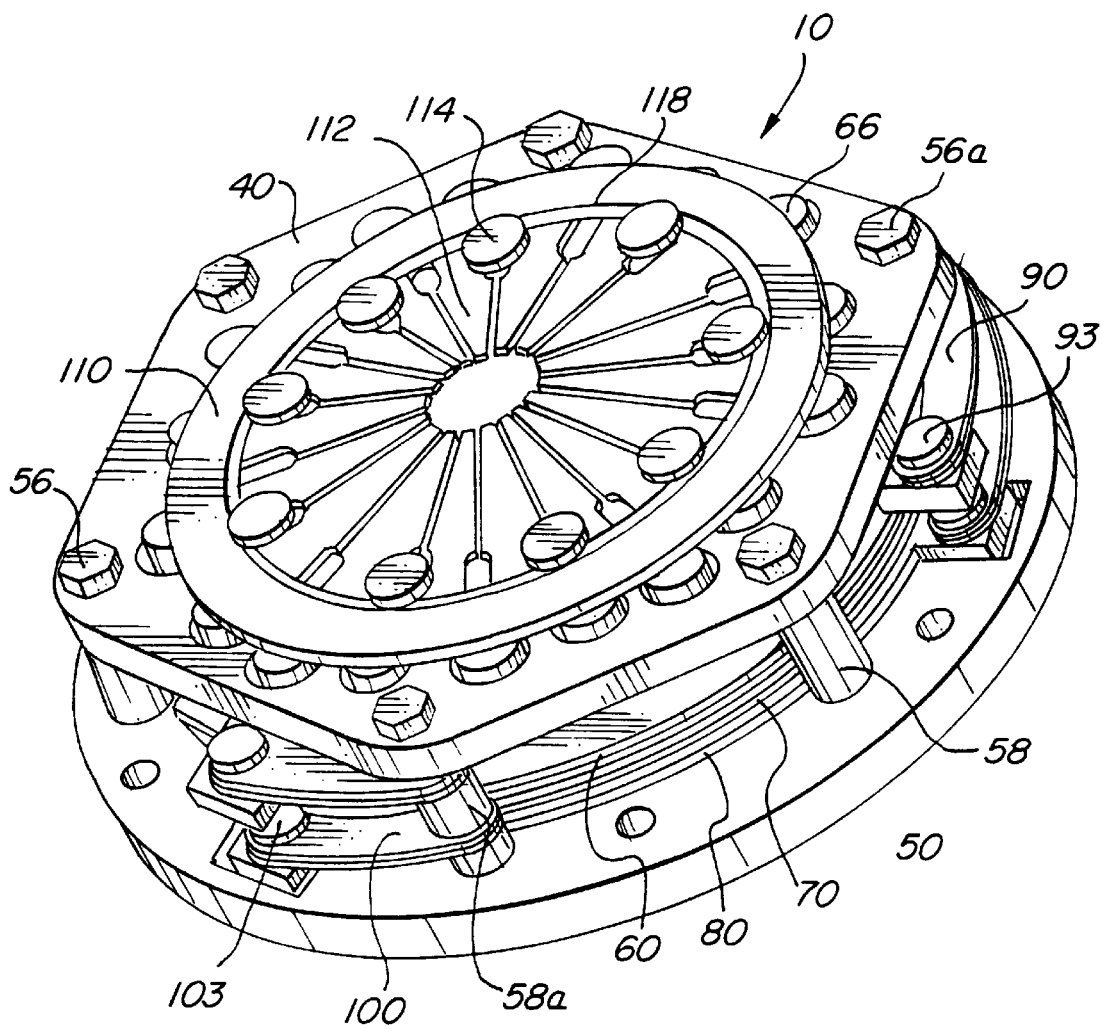
FIG. 3 is an isometric view of the disc clutch assembly of FIG. 1.

Located between the first and second plates 40, 50 are a first driving plate or disc 60, a second driving plate or disc 80 and a driven plate or disc 70. The first driving plate 60, which is positioned adjacent the first plate 40, includes tabs 62 on the periphery, with each tab 62 having an aperture 64. On the surface 65 of the first driving plate 60 facing the first plate 40, there are affixed dowel-shaped members 66. When assembled, these members 66 slide through the second set of apertures 44 of the first plate 40, as illustrated in FIG. 3. Although preferably affixed to the first driving plate 60, the members 66 may also be positioned to abut the first driving plate 60 without being affixed thereto.

The second driving plate 80, which is positioned adjacent the second plate 50, includes tabs 82 on the periphery, with each tab 82 having an aperture 84. The configuration of the second driving plate 80 is such as to correspond to an opening S1 of the second plate 50. This provides the following benefits: First, because the second driving plate 80 can occupy the opening 51 of the second plate 50, the thickness of the disc clutch assembly 10 along the axis 30 can be decreased by substantially the thickness of the second driving plate 80, thereby requiring less space for the disc clutch assembly 10. And second, by providing such a sizeable opening in the second plate 50, there is a cost benefit due to savings in the material used to form the second plate 50.

The driven plate 70, which is positioned between the first and second driving plates 60, 80, has a frictional surface on each side 72, 74 and an engagement interface, shown as a splined hub 76, for engaging with the torque destination 16. Each frictional surface 72, 74 of the driven plate 70 is formed from a suitable material, such as ceramic, organic, or resin cloth.

The disc clutch assembly 10 further includes a first set of straps 90 located between the first plate 40 and the first driving plate 60. Each strap 90 has two holes 92, 92a, one 92 of which is used for securing to the first driving plate 60 and the other 92a of which is used for securing to the first plate 40. As shown in FIG. 2, each strap 90 is secured to the first driving plate 60 by a rivet 93 extending through the hole 92 of the strap 90 and an aperture 64 of the first driving plate 60. Other conventional means for securing the strap 90 to the first driving plate 60 may also be employed. Each strap 90 is secured to the first plate 40 by fastening members extending from the first set of apertures 42 of the first plate 40 to the apertures 52 of the second plate 50 through the hole 92a. In the embodiment of the disc clutch assembly 10 illustrated in the Figures, these fastening members are shown as a screw 56a, an assembly dowel 58a, and a couple of cylindrical spacers 59. Note that other conventional fastening members may be utilized in place of the screw 56a, the assembly dowel 58a, and the spacers 59.

A second set of straps 100 are located between the first and second driving plates 60, 80. Each strap 100 has two holes 102, 102a, one 102 of which is used for securing to the second driving plate 80 and the other 102a of which is used for securing to the second plate 50. As shown in FIG. 2, each strap 100 is secured to the second driving plate 80 by a rivet 103 extending through the hole 102 of the strap 100 and an aperture 84 of the second driving plate 80. Other conventional means for securing the strap 100 to the second driving plate 80 may also be employed. Each strap 100 is secured to the second plate 50 by the fastening members, which include the screw 56a, the assembly dowel 58a, and the cylindrical spacers 59. Note that other conventional fastening members may be utilized instead.

Secured to the first plate 40 on the torque destination 16 side is a resilient member, which is shown as a diaphragm member 110 in the Figures. The diaphragm member 110 is mounted to the first plate 40 by rivets 114 extending through slots 116 of the diaphragm member 110 and the third set of apertures 46 of the first plate 40. Other conventional means for securely mounting the diaphragm member 110 to the first plate 40 may also be utilized.

Figure 4:
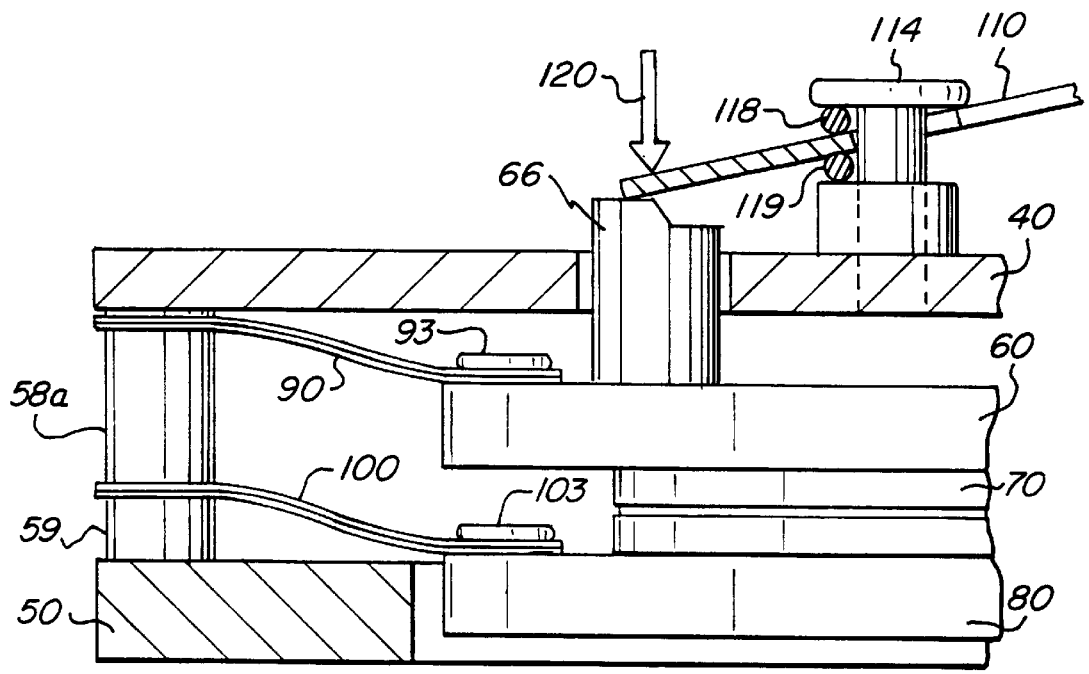
FIG. 4 is a cross-sectional, partial side view of the disc clutch assembly of FIG. 1 in clutch engaged position.
Figure 5:
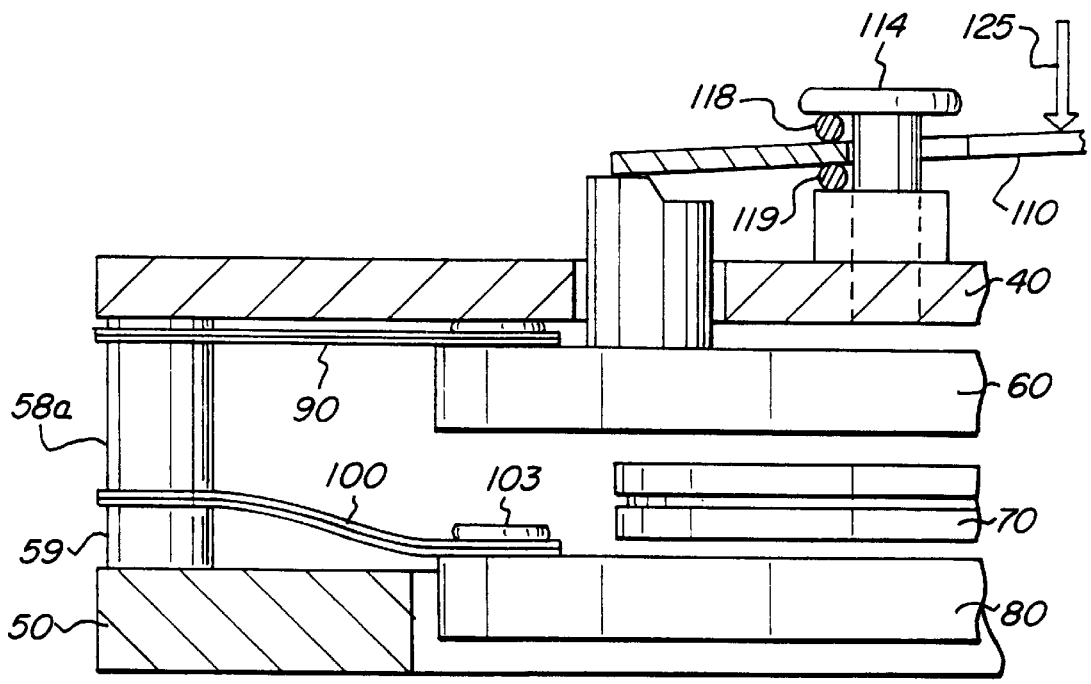
FIG. 5 is a cross-sectional, partial side view of the disc clutch assembly of FIG. 1 in clutch disengaged position.

The diaphragm member 110 includes a radial array of resilient or springlike fingers 112. Rings 118, 119 are shown in the Figures positioned adjacent the diaphragm member 110 and secured thereto by the rivets 114 to serve as a fulcrum during operation of the diaphragm member 110, as illustrated in FIGS. 4 and 5. The diaphragm member 110 is in a contacting relationship with the members 66 (FIG. 3). The operation of the diaphragm member 110 will be described hereinbelow.

It is understood that the number of driving and driven plates in the disc clutch assembly 10 can be routinely varied, and the diameters and thicknesses can also be varied within the skill in the art depending upon whether the application is heavy duty or otherwise. Preferably, the driving plates 60, 80 are formed of material such as hot rolled pickled and oiled steel, cold rolled steel, cast steel, or cast iron. The driven plate 70 is preferably formed of steel or other suitable material. The frictional surface on each side 72, 74 of the driven plate 70 is made of material such as ceramic, organic, or resin cloth or other suitable material. The first and second plates 40, 50 are preferably formed of material such as hot rolled pickled and oiled steel, cold rolled steel, cast steel, or cast iron. The diaphragm member 110 is preferably formed from steel. Also, the straps 90, 100 are preferably made from steel.

The operation of the disc clutch assembly 10 of the present invention will be described with reference to FIGS. 4 and 5. FIG. 4 shows the clutch assembly 10 in the clutch engaged position, while FIG. 5 shows the clutch assembly 10 in the clutch disengaged position.

In the clutch engaged position, which occurs when the throwout bearing 20 (shown in FIG. 1) is not biasing the fingers 112 of the diaphragm member 110, the fingers 112 apply a force indicated by arrow 120 against the members 66 to urge the first driving plate 60 along axis 30 to force the stack of plates 60, 70, 80 into frictional driving engagement as illustrated in FIG. 4. The straps 90, 100 serve to distribute the force 120 applied on the members 66 by the fingers 112 and to reduce rattling between the plates 60, 70, 80 so that there is reduced frictional wear of the members 66 and other components. Furthermore, by better distributing the force 120 applied on the members 66, the straps also serve to better effectuate clutch engagement.

In the clutch disengaged position, which occurs when the throwout bearing 20 is biasing the fingers 112 of the diaphragm member 110 along axis 30 as indicated by arrow 125, the force 125 causes the fingers 112 to pivot about the rings 118, 119 to reduce the force indicated by 120 sufficiently to effect the separation of the plates 60, 70, 80. The separation of the plates 60, 70, 80 removes the frictional driving engagement of the plates 60, 70, 80. The straps 90 serve to better distribute the force of the members 66 away from the driven plate 70 to better effectuate clutch disengagement and to reduce rattling between the components which results in frictional wear of the members 66 and other components.

As illustrated in the drawings, the disc clutch assembly 10 of the present invention is designed to avoid use of complicated linkage mechanisms and to promote air circulation between the components so that there is no damaging heat buildup.

It is to be understood that clutches built in accordance with the present invention may have a varying number of straps of different configuration without departing from the spirit of this invention.

Although the invention has been described with reference to particular arrangements of parts, features, and the like, these are not intended to exhaust all possible parts, arrangements or features, and indeed, may other modifications and variations will be ascertainable to those of skill in the art.

What is claimed is:

1. A disc clutch assembly for transmitting torque from a torque source to a torque destination, which comprises:
    a first plate having apertures;
    a second plate located between the torque source and said first plate, said second plate being in driving engagement with the torque source;
    fastening members for securing said first plate to said second plate;
    a first driving plate having apertures, said first driving plate located between said first and second plates;
    a second driving plate having apertures, said second driving plate secured to said second plate between said second plate and said first driving plate;
    a driven plate located between said first driving plate and said second driving plate, said driven plate having a frictional surface and an engagement interface for engaging with the torque destination;
    a resilient member secured to said first plate, said resilient member being operable to provide force toward the torque source and being operable to release said force;
    substantially dowel-shaped members positioned adjacent said first driving plate and slidable through said apertures of said first plate to be adjacent said resilient member, said dowel-shaped members responsive to the release of said force of said resilient member to urge said first driving plate, said second driving plate and said driven plate toward each other such that said driven plate is in torque transmitting contact with said first driving plate and said second driving plate, said dowel-shaped members responsive to the application of said force to release said driven plate from the torque transmitting contact; and
    a first set of straps attached to said first plate and said first driving plate via said apertures of said first driving plate and a second set of straps attached to said second plate and said second driving plate via said apertures of said second driving plate, said first set of straps and said second set of straps responsive in conjunction with said dowel-shaped members to the application and release of said force of said resilient member to better effectuate clutch engagement and disengagement and to reduce wear of said dowel-shaped members.

2. The disc clutch assembly of claim 1, wherein said second plate defines an opening configured to correspond to the configuration of said second driving plate for substantially receiving said second driving plate so that the overall thickness of the disc clutch assembly is reduced.

3. The disc clutch assembly of claim 1, wherein said second set of straps are attached to said second plate by said fastening members.

4. The disc clutch assembly of claim 1, wherein said first set of straps are attached to said first plate by said fastening members.

5. The disc clutch assembly of claim 1, wherein said dowel-shaped members are affixed to said first driving plate.

6. The disc clutch assembly of claim 1, wherein said apertures of said first driving plate are located on tabs on the periphery of said first driving plate and said apertures of said second driving plate are located on tabs on the periphery of said second driving plate.

7. A disc clutch assembly for transmitting torque from a torque source to a torque destination, which comprises:
    a first plate having a first set of apertures and a second set of apertures;
    a second plate having apertures, said second plate located between the torque source and said first plate and being in driving engagement with the torque source;
    fasteners extending from said first set of apertures of said first plate to said apertures of said second plate for securing said first plate to said second plate;
    a first driving plate having apertures, said first driving plate located between said first and second plates;
    a second driving plate having apertures, said second driving plate secured to said second plate between said second plate and said first driving plate;
    a driven plate located between said first driving plate and said second driving plate, said driven plate having a frictional surface and an engagement interface for engaging with the torque destination;
    a diaphragm member secured to said first plate, said diaphragm member being operable to provide force toward the torque source and being operable to release said force;
    dowels affixed to said driving plate, said dowels positioned to be slidable through said second set of apertures of said first plate to be adjacent said diaphragm member, said dowels responsive to the release of said force of said diaphragm member to urge said first driving plate, said second driving plate and said driven plate toward each other such that said driven plate is in torque transmitting contact with said first driving plate and said second driving plate, said dowels responsive to the application of said force to release said driven plate from the torque transmitting contact; and
    a first set of straps attached to said fasteners and said first driving plate via said apertures of said first driving plate and a second set of straps attached to said fasteners and said second driving plate via said apertures of said second driving plate, said first set of straps and said second set of straps responsive in conjunction with said dowels to the application and release of said force of said diaphragm member to better effectuate clutch engagement and disengagement and to reduce wear of said dowels.

8. The disc clutch assembly of claim 7, wherein said second plate defines an opening configured to correspond to the configuration of said second driving plate for substantially receiving said second driving plate so that the overall thickness of the disc clutch assembly is reduced.

9. The disc clutch assembly of claim 7, wherein said apertures of said second driving plate are located on tabs on the periphery of said second driving plate.

10. The disc clutch assembly of claim 7, wherein said apertures of said first driving plate are located on tabs on the periphery of said first driving plate.

11. A disc clutch assembly for transmitting torque from a torque source to a torque destination, which comprises:

a first plate having apertures;

a second plate located between the torque source and said first plate, said second plate being in driving engagement with the torque source;

fastening members for securing said first plate to said second plate;

a driving plate having apertures, said driving plate located between said first and second plates;

a driven plate located between said driving plate and said second plate, said driven plate having a frictional surface and an engagement interface for engaging with the torque destination;

a resilient member secured to said first plate, said resilient member being operable to provide force toward the torque source and being operable to release said force;

substantially dowel-shaped members positioned adjacent said driving plate and slidable through said apertures of said first plate to be adjacent said resilient member, said dowel-shaped members responsive to the release of said force of said resilient member to urge said driving plate and said driven plate toward each other such that said driven plate is in torque transmitting contact with said driving plate, said dowel-shaped members responsive to the application of said force to release said driven plate from the torque transmitting contact;

straps attached to said first plate and said driving plate via said apertures of said driving plate, said straps responsive in conjunction with said dowel-shaped members to the application and release of said force of said resilient member to better effectuate clutch engagement and disengagement and to reduce wear of said dowel-shaped members; and wherein said straps are attached to said first plate by said fastening members.

12. The disc clutch assembly of claim 11, further comprising:

a second driving plate having apertures, said second driving plate secured to said second plate and being responsive to the urging of said dowel-shaped members for transmitting torque to said driven plate;

a second set of straps attached to said second plate and said second driving plate via said apertures of said second driving plate, said second set of straps responsive in conjunction with said dowel-shaped members to the application and release of said force of said resilient member to better effectuate clutch engagement and disengagement and to reduce wear of said dowel-shaped members.

13. The disc clutch assembly of claim 12, wherein said second plate defines an opening configured to correspond to the configuration of said second driving plate for substantially receiving said second driving plate so that the overall thickness of the disc clutch assembly is reduced.

14. The disc clutch assembly of claim 12, wherein said second set of straps are attached to said second plate by said fastening members.

15. The disc clutch assembly of claim 11, wherein said dowel-shaped members are affixed to said driving plate.

16. The disc clutch assembly of claim 11, wherein said apertures of said driving plate are located on tabs on the periphery of said driving plate.

* * * * *